(12) United States Patent
Ahn et al.

(10) Patent No.: US 10,298,066 B2
(45) Date of Patent: May 21, 2019

(54) APPARATUS AND METHOD FOR RECEIVING WIRELESS POWER, AND SYSTEM FOR TRANSMITTING WIRELESS POWER

(71) Applicant: ELECTRONICS AND TELECOMMUNICATIONS RESEARCH INSTITUTE, Daejeon (KR)

(72) Inventors: Duk Ju Ahn, Daejeon (KR); In Kui Cho, Daejeon (KR); Seong Min Kim, Daejeon (KR); Jung Ick Moon, Daejeon (KR); Sang Bong Jeon, Daejeon (KR); Byung Chan Kim, Daejeon (KR); Je Hoon Yun, Daejeon (KR); Dong Won Jang, Daejeon (KR); Hyung Do Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 231 days.

(21) Appl. No.: 15/240,043

(22) Filed: Aug. 18, 2016

(65) Prior Publication Data

US 2017/0201126 A1 Jul. 13, 2017

(30) Foreign Application Priority Data

Jan. 11, 2016 (KR) .................. 10-2016-0003340

(51) Int. Cl.
*H01F 27/42* (2006.01)
*H01F 37/00* (2006.01)
(Continued)

(52) U.S. Cl.
CPC .............. *H02J 50/12* (2016.02); *H02J 50/80* (2016.02)

(58) Field of Classification Search
None
See application file for complete search history.

(56) References Cited

U.S. PATENT DOCUMENTS 9,842,688 B2 * 12/2017 Kurs ................. H01F 38/14
2010/0277003 A1 * 11/2010 Von Novak ............ H02J 17/00
307/104
(Continued)

FOREIGN PATENT DOCUMENTS

JP 2012-23949 2/2012
KR 10-2010-0011329 2/2010
(Continued)

OTHER PUBLICATIONS

W. X. Zhong et al., "Maximum Energy Efficiency Tracking for Wireless Power Transfer Systems", IEEE Transactions on Power Electronics, vol. 30, No. 7, Jul. 2015; pp. 4025-4034.

*Primary Examiner* — Alfonso Perez Borroto
*Assistant Examiner* — Esayas G Yeshaw
(74) *Attorney, Agent, or Firm* — Kile Park Reed & Houtteman PLLC

(57) ABSTRACT

The wireless power reception apparatus includes: a duty controller configured to calculate an amount of current of a transmission coil required for the wireless power transmission apparatus and control a duty cycle by using at least one of distance information between the wireless power transmission apparatus and the wireless power reception apparatus or load current information; a power converter configured to convert an effective load resistance according to the duty cycle; a wireless data transmitter configured to transmit a signal that requires a control of the calculated amount of current of the transmission coil to the wireless
(Continued)

power transmission apparatus; and a reception resonator configured to receive a power according to the amount of current of the transmission coil controlled by the signal that requires a control of the amount of current of the transmission coil from the wireless power transmission apparatus.

10 Claims, 17 Drawing Sheets

(51) Int. Cl.
  *H01F 38/00* (2006.01)
  *H02J 50/12* (2016.01)
  *H02J 50/80* (2016.01)

(56) References Cited

U.S. PATENT DOCUMENTS

| | | | | |
|---|---|---|---|---|
| 2011/0309689 | A1* | 12/2011 | Kamata | H02J 5/005 307/104 |
| 2012/0080944 | A1* | 4/2012 | Recker | H02J 9/02 307/25 |
| 2012/0119587 | A1 | 5/2012 | Cheon et al. | |
| 2012/0155133 | A1* | 6/2012 | Kim | H02J 5/005 363/84 |
| 2012/0306284 | A1* | 12/2012 | Lee | H02J 17/00 307/104 |
| 2014/0132210 | A1* | 5/2014 | Partovi | H02J 5/005 320/108 |
| 2014/0240057 | A1* | 8/2014 | Low | H04B 5/0037 333/32 |
| 2014/0253275 | A1* | 9/2014 | Shijo | H01F 27/34 336/105 |
| 2015/0207357 | A1 | 7/2015 | Youm et al. | |
| 2015/0263531 | A1* | 9/2015 | Kozakai | H02J 50/80 307/104 |
| 2015/0318714 | A1 | 11/2015 | Kamata | |
| 2015/0357991 | A1* | 12/2015 | Ono | H02J 17/00 320/108 |
| 2016/0012967 | A1* | 1/2016 | Kurs | H02J 50/12 307/104 |
| 2017/0302086 | A1* | 10/2017 | Kwan | H02J 5/005 |

FOREIGN PATENT DOCUMENTS

| | | |
|---|---|---|
| KR | 10-2014-0040570 | 4/2014 |
| KR | 10-1390954 | 4/2014 |
| KR | 10-2015-0028133 | 3/2015 |

* cited by examiner

APPARATUS AND METHOD FOR RECEIVING WIRELESS POWER, AND SYSTEM FOR TRANSMITTING WIRELESS POWER

CROSS-REFERENCE TO RELATED APPLICATION

This application claims the benefit of priority to Korean Patent Application No. 10-2016-0003340, filed on Jan. 11, 2016 in the Korean Intellectual Property Office, the disclosure of which is incorporated herein in its entirety by reference.

BACKGROUND OF THE INVENTION

Field of the Invention

The present disclosure relates to an apparatus for receiving a wireless power, a system for transmitting a wireless power including the same, and a method for controlling automatically an effective load resistance conversion ratio of a receiving end, and more particularly, to a technology of increasing a wireless transmission efficiency by adjusting a load resistance of the receiving end according to a distance change and a load change in a device that transmits power (or energy) wirelessly.

Description of the Related Art

A wireless power transmission system may be configured by a transmitter DC power supply, a transmitter resonant inverter, a transmission resonator, a reception resonator, a rectifier circuit, and a power converter. In order to get a high efficiency under constrains of a low coupling and a small resonator, the load resistance of a receiver should be optimized accordingly.

In addition, in addition to the transmission efficiency, a capability to transmit over a power amount required by the receiver may be also needed. Particularly, when the distance between a transmitter and the receiver increases, it is impossible to supply enough power to the receiver. A load resistance value as well as the distance may also influence on a power transmission amount. Consequently, in order to transmit a desired power to the receiver with a high efficiency, a load resistance value should be appropriately selected.

The problem is that it is difficult to arbitrarily change the load resistance value. That is, the load resistance is determined by a power requirement amount of a device which actually consumes a power, but is not a design parameter of a system. By using an impedance conversion circuit, it is possible to convert a value of the effective load resistance viewed from the reception resonator, and to improve performance.

However, the existing impedance conversion circuits cannot change arbitrarily an impedance conversion ratio but have a fixed conversion rate.

This is disadvantageous in that the performance may be degraded and the system may become unstable when the distance is changed or when the loading current is changed, although it is possible to achieve a performance optimization under a certain distance or a certain loading current condition.

SUMMARY OF THE INVENTION

The present disclosure has been made in view of the above problems, and provides an apparatus for receiving a wireless power which can automatically adjust a conversion ratio of a load resistance of a receiving end according to a distance between a transmitter and a receiver, and a change of a load resistance of the receiver, a system for transmitting a wireless power including the same, and a method for controlling automatically an effective load resistance conversion ratio of a receiving end.

In accordance with an aspect of the present disclosure, a wireless power reception apparatus which receives a power from a wireless power transmission apparatus includes: a duty controller configured to calculate an amount of current of a transmission coil required for the wireless power transmission apparatus and control a duty cycle by using at least one of distance information between the wireless power transmission apparatus and the wireless power reception apparatus or load current information; a power converter configured to convert an effective load resistance according to the duty cycle; a wireless data transmitter configured to transmit a signal that requires a control of the calculated amount of current of the transmission coil to the wireless power transmission apparatus; and a reception resonator configured to receive a power according to the amount of current of the transmission coil controlled by the signal that requires a control of the amount of current of the transmission coil from the wireless power transmission apparatus, wherein the duty controller controls the duty cycle of the power converter in response to the power received according to the amount of current of the transmission coil controlled by the signal that requires a control of the amount of current of the transmission coil. The wireless power reception apparatus further includes a rectifier configured to rectify and output the current outputted from the reception resonator. The power converter is located between the reception resonator and the rectifier. The power converter is located in an output terminal of the rectifier. The wireless data transmitter transmits a signal requesting to increase the amount of current of the transmission coil to the wireless power transmission apparatus when a distance between the wireless power transmission apparatus and the wireless power reception apparatus increases. The duty controller controls the power converter to decrease the effective load resistance when the distance between the wireless power transmission apparatus and the wireless power reception apparatus increases. The wireless data transmitter transmits a signal requesting to decrease the amount of current of the transmission coil to the wireless power transmission apparatus, when a load resistance of the wireless power reception apparatus increases. The duty controller controls the power converter to decrease the effective load resistance, when the load resistance of the wireless power reception apparatus increases. The duty controller determines a distance change between the wireless power transmission apparatus and the wireless power reception apparatus increases by using a PWM duty cycle of the power converter. The wireless data transmitter periodically modulates and transmits the duty cycle of the power converter at a frequency band lower than a preset reference, when transmitting the signal for a control of the amount of current of the transmission coil to the wireless power transmission apparatus.

In accordance with another aspect of the present disclosure, a wireless power transmission system includes: a wireless power transmission apparatus configured to transmit a power according to an amount of current of a transmission coil; and a wireless power reception apparatus configured to receive the power transmitted from the wireless power transmission apparatus, wherein, when the wireless power reception apparatus transmits a signal for controlling the amount of current of a transmission coil of the wireless power transmission apparatus to the wireless power transmission apparatus according to a distance change between the wireless power transmission apparatus and the wireless power reception apparatus or a load resistance change, the wireless power transmission apparatus adjusts the amount of current of a transmission coil according to the signal for controlling the amount of current of a transmission coil and transmits a power, and the wireless power reception apparatus adjusts a duty cycle of a power converter in response to the adjusted amount of current of a transmission coil.

In accordance with another aspect of the present disclosure, a method of receiving a power by a wireless power reception apparatus comprising a reception resonator and a power converter from a wireless power transmission apparatus includes: transmitting a signal for controlling an amount of current of a transmission coil of the wireless power transmission apparatus to the wireless power transmission apparatus according to a distance change between the wireless power transmission apparatus and the wireless power reception apparatus or a load resistance change; receiving a power which is outputted after the amount of current of a transmission coil is adjusted from the wireless power transmission apparatus; adjusting an effective load resistance conversion ratio of the power converter in response to the received power; and converting an effective load resistance according to the effective load resistance conversion ratio. Transmitting a signal for controlling an amount of current of a transmission coil of the wireless power transmission apparatus to the wireless power transmission apparatus includes transmitting a signal requesting to increase the amount of current of the transmission coil to the wireless power transmission apparatus when a distance between the wireless power transmission apparatus and the wireless power reception apparatus increases. Transmitting a signal for controlling an amount of current of a transmission coil of the wireless power transmission apparatus to the wireless power transmission apparatus includes transmitting a signal requesting to decrease the amount of current of the transmission coil to the wireless power transmission apparatus, when a load resistance of the wireless power reception apparatus increases. Adjusting an effective load resistance conversion ratio of the power converter in response to the received power includes increasing the effective load resistance conversion ratio, when the amount of current of the transmission coil is decreased. Adjusting an effective load resistance conversion ratio of the power converter in response to the received power includes decreasing the effective load resistance conversion ratio, when the amount of current of the transmission coil is increased.

BRIEF DESCRIPTION OF THE DRAWINGS

The objects, features and advantages of the present disclosure will be more apparent from the following detailed description in conjunction with the accompanying drawings, in which.

DETAILED DESCRIPTION OF EXEMPLARY EMBODIMENTS

Exemplary embodiments of the present disclosure are described with reference to the accompanying drawings in detail. The same reference numbers are used throughout the drawings to refer to the same or like parts. Detailed descriptions of well-known functions and structures incorporated herein may be omitted to avoid obscuring the subject matter of the present disclosure.

Hereinafter, embodiments of the present disclosure are described in detail with reference to FIG. 1 to FIG. 15.

A reflected resistance is a resistor which is reflected to a wireless power transmission apparatus and a transmission efficiency of the wireless power transmission system increases as the reflected resistance becomes higher.

Figure 1:
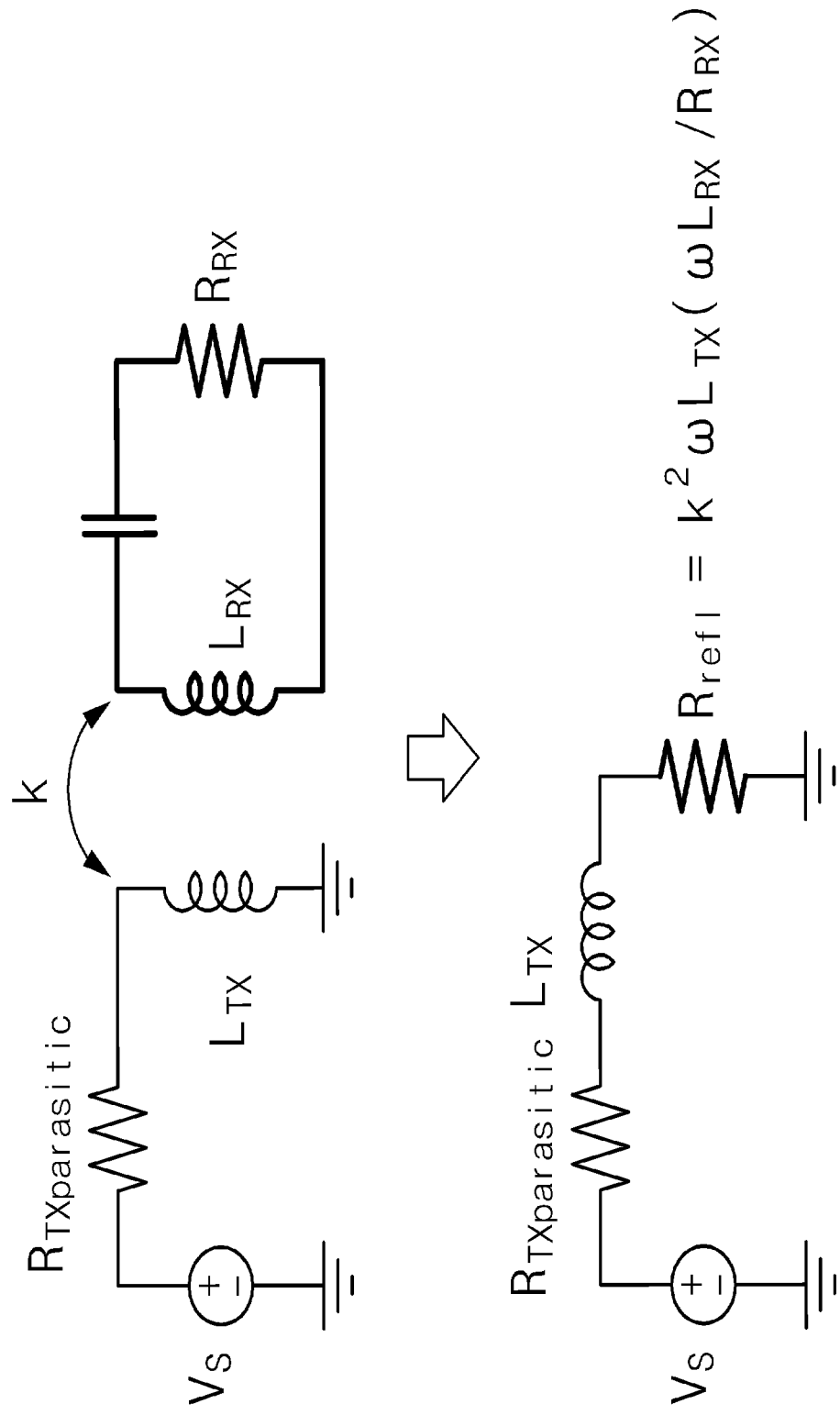
FIG. 1 is an exemplary diagram illustrating a relationship of a serial receiving resonator and a reflected resistance.

FIG. 1 is an exemplary diagram illustrating a relationship of a serial receiving resonator and a reflected resistance, and shows an equivalent model when an apparatus for receiving a wireless power (hereinafter, a wireless power reception apparatus) is supplied with a power from a transmission coil of an apparatus for transmitting a wireless power (hereinafter, a wireless power transmission apparatus) in a wireless power transmission system.

As shown in FIG. 1, the magnitude of the power consumed in the reflected resistance (Rref1) may be identical with the magnitude of the power transmitted to the wireless power reception apparatus, and the reflected resistance (Rref1) may be determined by a change (k) of distance and a change ($R_{RX}$) of actual load resistance.

Figure 2:
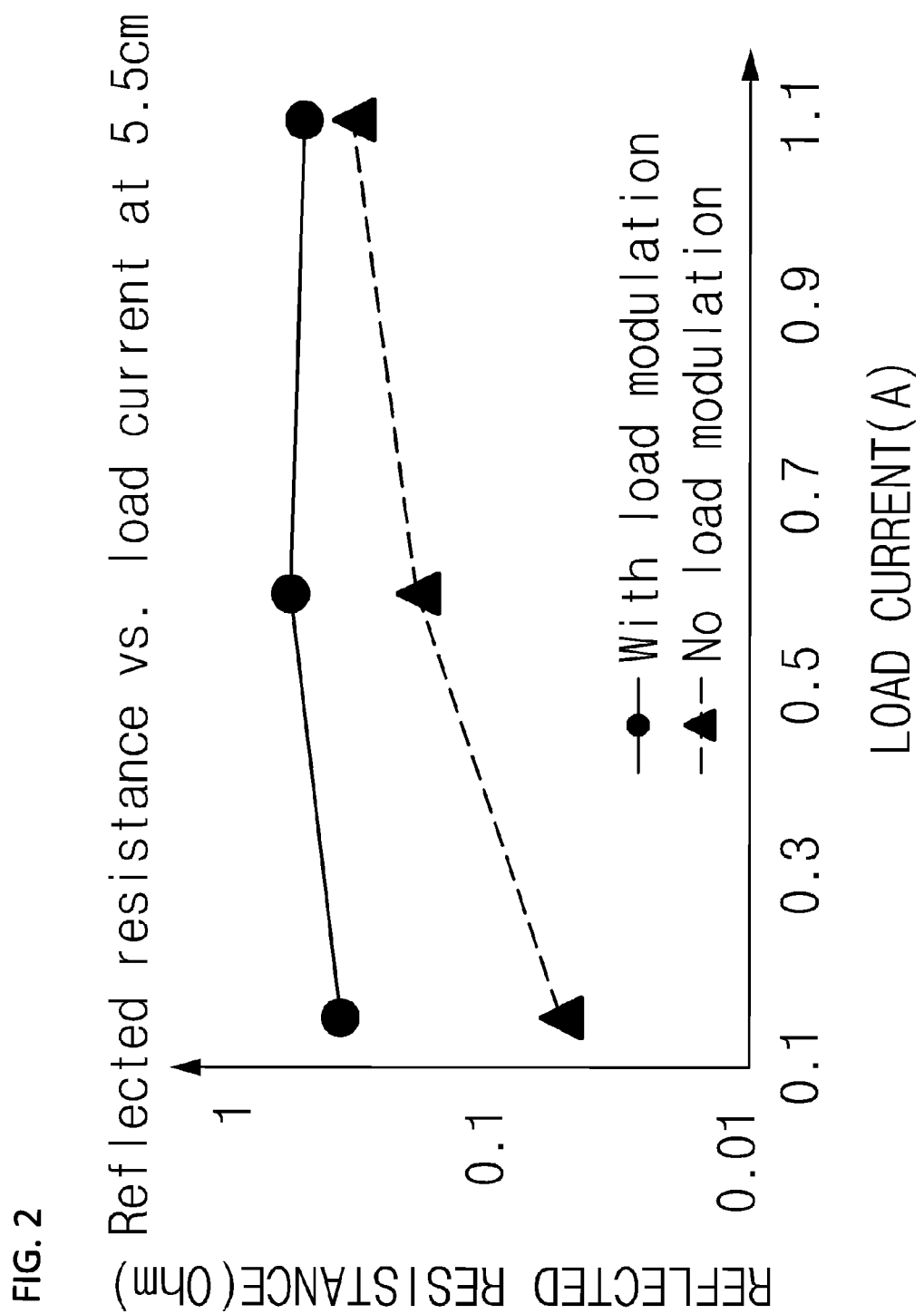
FIG. 2 is a graph illustrating a magnitude of a reflected resistance in accordance with a change of a load current in a wireless power reception apparatus.
Figure 3:
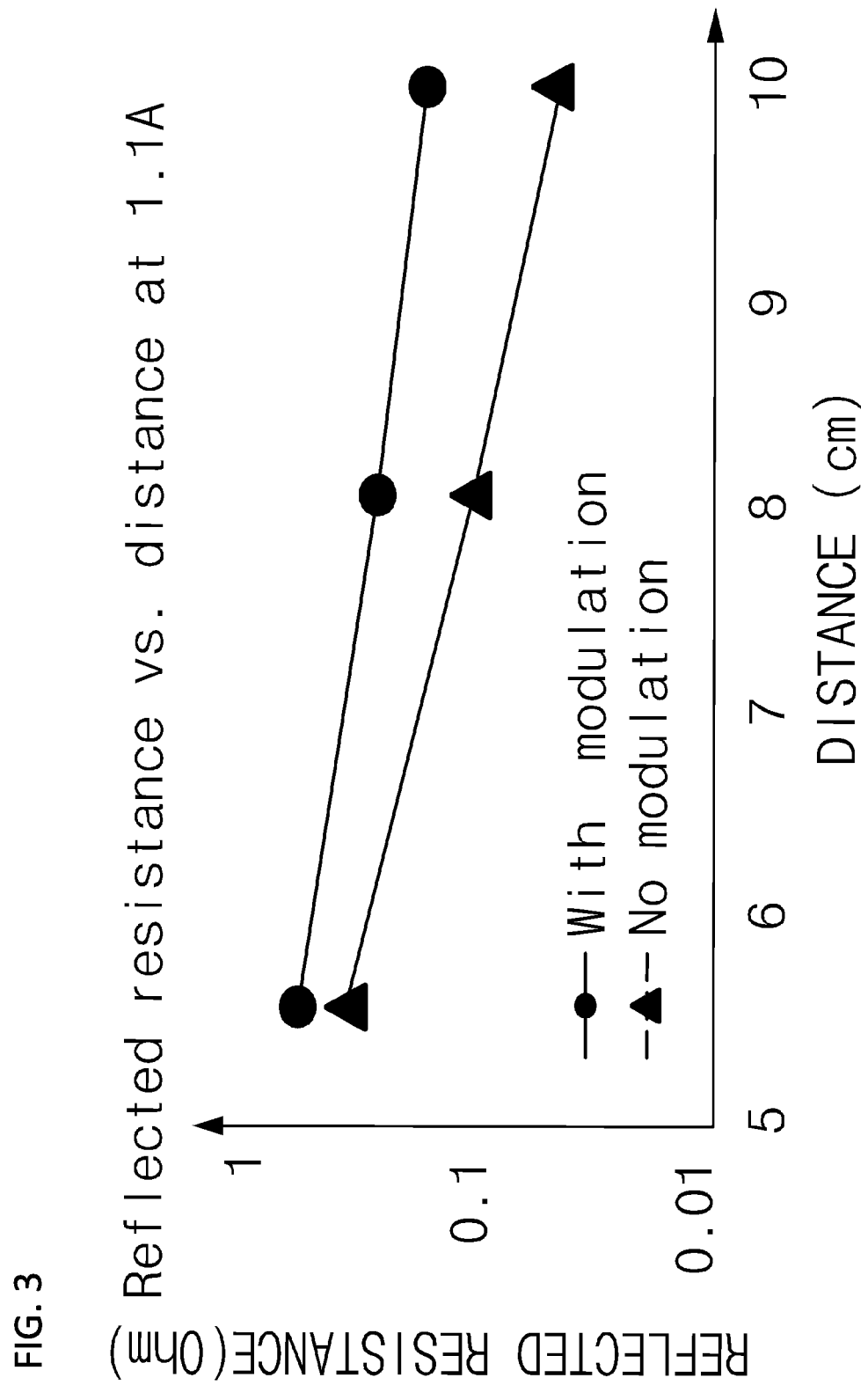
FIG. 3 is a graph illustrating a magnitude of a reflected resistance in accordance with a distance change between a wireless power transmission apparatus and a wireless power reception apparatus.

That is, when the reflected resistance is decreased by the change (k) of distance and the change ($R_{RX}$) of actual load resistance, the transmission efficiency from the wireless power transmission apparatus to the wireless power reception apparatus is decreased. FIG. 2 is a graph illustrating a magnitude of a reflected resistance in accordance with a change of a load resistance (load current) in a wireless power reception apparatus, and FIG. 3 is a graph illustrating a magnitude of a reflected resistance in accordance with a distance change between a wireless power transmission apparatus and a wireless power reception apparatus.

Referring to FIG. 2, it can be seen that the reflected resistance increases as the load resistance becomes smaller. Referring to FIG. 3, it can be seen that the reflected resistance decreases as the change of the distance becomes greater. Since the transmission efficiency becomes higher as the reflected resistance becomes greater, the present disclosure may control a load resistance conversion ratio of the reception apparatus to achieve a higher reflected resistance.

Thus, the wireless power reception apparatus may be provided with a power converter to convert an actual load resistance ($R_L$) into an effective load resistance ($R_{EFF}$). At this time, assuming that the duty cycle of the power converter is D, the actual load resistance ($R_L$) of an output terminal of the converter may be converted into the effective load resistance ($R_{EFF}$) according to the following Equations 1, 2, 3.

As shown in Equations 1, 2, 3, the power converter may adjust the conversion ratio of the effective load resistance by adjusting its own duty cycle.

$$R_{EFF} = (1/D)^2 R_L \quad \text{[Equation 1]}$$

$$R_{EFF} = (1-D)^2 R_L \quad \text{[Equation 2]}$$

$$R_{EFF} = \left(\frac{1-D}{D}\right)^2 R_L \quad \text{[Equation 3]}$$

Equation 1 is an equation for obtaining an effective load resistance conversion ratio of a buck converter, Equation 2 is an equation for obtaining an effective load resistance conversion ratio of a boost converter, and Equation 3 is an equation for obtaining an effective load resistance conversion ratio of a buck-boost converter.

Thus, the power converter may have various types such as a buck, a boost, a buck-boost, and the like, or may use a different power converter in addition to the above-described example.

Figure 4:
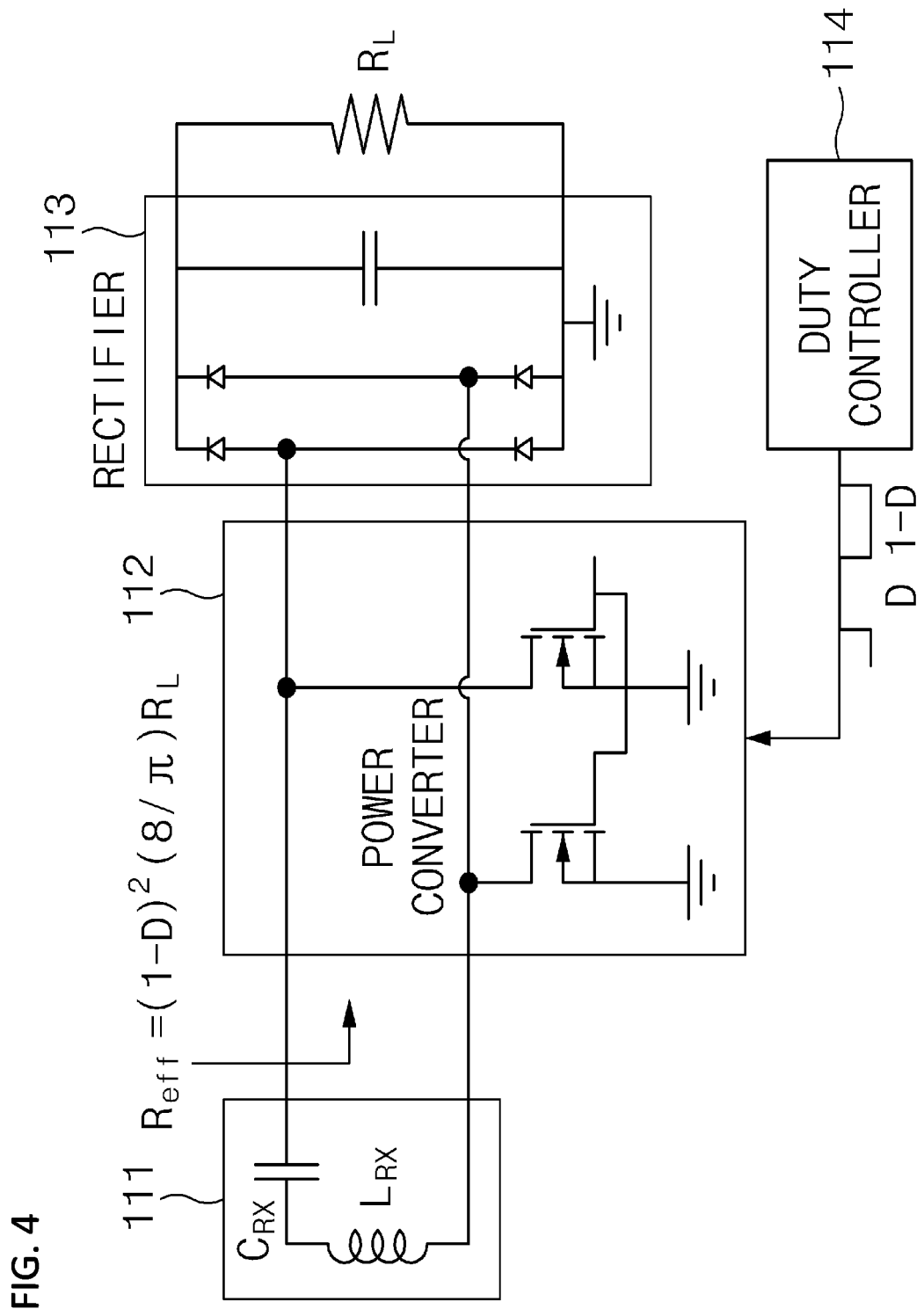
FIG. 4 is a diagram illustrating a position of a power converter within a wireless power reception apparatus according to an embodiment of the present disclosure.
Figure 5:
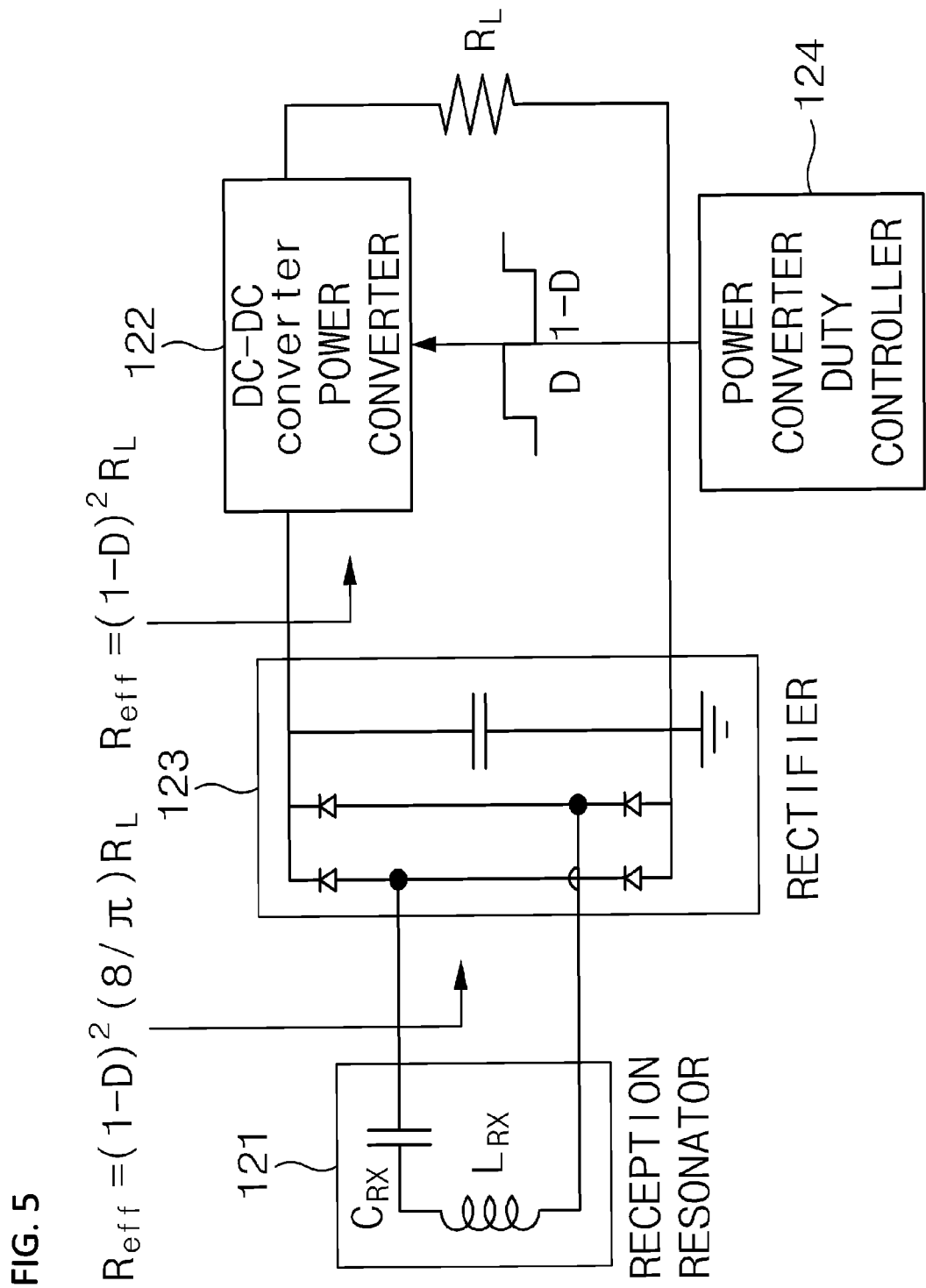
FIG. 5 is a diagram illustrating a position of a power converter within a wireless power reception apparatus according to another embodiment of the present disclosure.

There are various method of inserting the power converter into the wireless power reception apparatus. As shown in FIG. 4, a boost power converter 112 may be provided between a reception resonator 111 and a rectifier 113. In addition, as shown in FIG. 5, a power converter 122 may be provided in a rear end of a rectifier 123. Referring to FIG. 4 and FIG. 5, the position of the actual load resistance ($R_L$) and the effective load resistance (Reff) can be seen.

Figure 6:
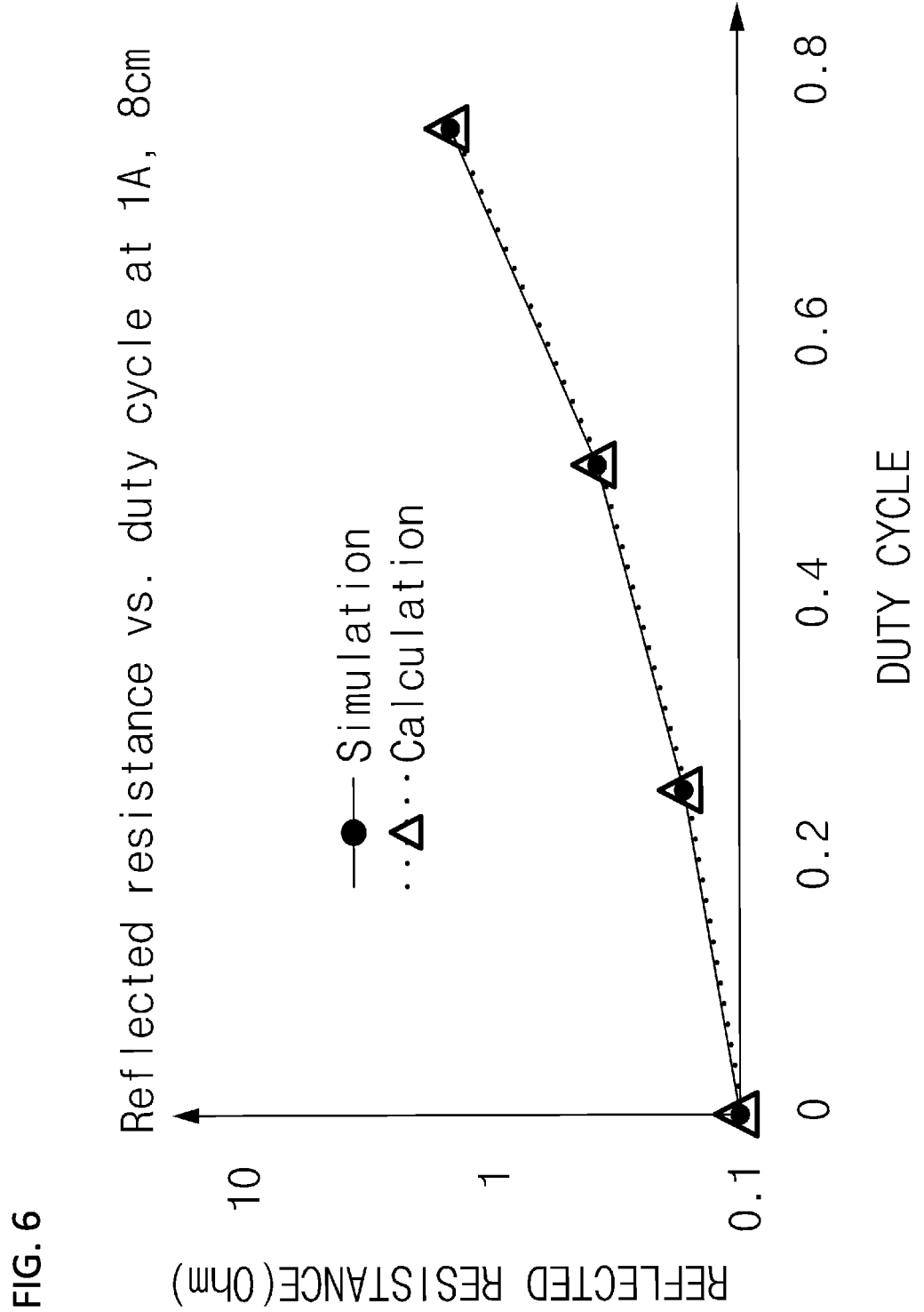
FIG. 6 is a graph illustrating a change of a reflected resistance in accordance with a duty cycle in the case of using a boost power converter according to an embodiment of the present disclosure.

FIG. 6 is a graph illustrating a change of a reflected resistance in accordance with a duty cycle in the case of using a boost power converter according to an embodiment of the present disclosure.

Referring to FIG. 6, when the wireless power reception apparatus is provided with a power converter of a boost type, the effective load resistance may be modulated and the reflected resistance may be increased by adjusting a duty cycle. The graphs A, C of FIG. 2 and FIG. 3 represent a change in the reflected resistance in the case of converting the actual load resistance into the effective load resistance (Reff) by using a power converter, and it can be seen that the reflected resistance is significantly increased in comparison with the graphs B, D prior to the modulation.

When the effective load resistance (Reff) for obtaining the maximum efficiency is referred to as an optimum effective load resistance ($R_{EFF}$, opt), the equation for calculating the optimum effective load resistance can be expressed as a following Equation 4.

$$R_{EFF,OPT} = R_{P2}\sqrt{1 + \frac{\omega^2 k^2 L_{TX} L_{RX}}{R_{P1} R_{P2}}} \quad \text{[Equation 4]}$$

As disclosed in the above Equation 4, the optimum effective load resistance ($R_{EFF}$, opt) may be changed depending on the change in the coupling (k) according to the distance change between the wireless power transmission apparatus and the wireless power reception apparatus. In addition, if the actual load resistance (RL) is changed, the effective load resistance (Reff) is changed, but the optimal effective load resistance (Reff, opt) is not changed but maintained. Therefore, when a coupling coefficient or the actual load resistance is changed, the effective load resistance (Reff) should be converted to the optimal effective load resistance (Reff, opt) by using the power converter.

In the case of FIG. 4 that uses a Boost type power converter, if the actual load resistance (RL) increases as the load current decreases, the duty cycle D should be increased by Equation 2. Then, the effective load resistance (Reff) can be kept small.

When the coupling (k) is decreased as the distance between the wireless power transmission apparatus and the wireless power reception apparatus is increased, the duty cycle D should be increased. When the coupling (k) is decreased, the optimum effective load resistance of Equation 4 is decreased. Accordingly, the effective load resistance (Reff) may be made small by increasing the duty cycle D by Equation 2.

Figure 7:
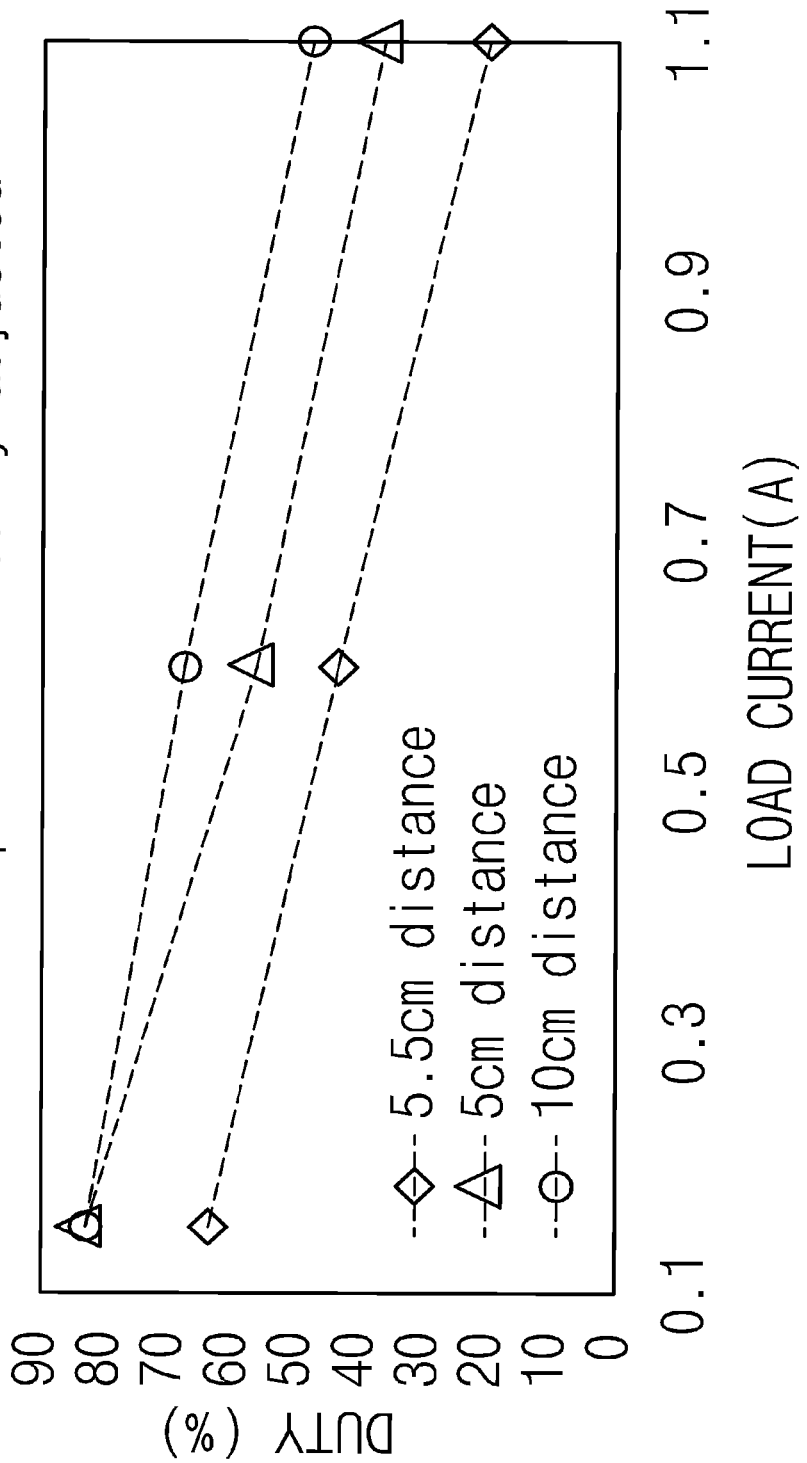
FIG. 7 is a graph illustrating an example of an optimum duty of a power converter in accordance with a load current and a distance change according to an embodiment of the present disclosure.

FIG. 7 is a graph illustrating an example of an optimum duty of a power converter in accordance with a load current and a distance change according to an embodiment of the present disclosure.

At this time, the duty D of the power converter may be adjusted through the control of the amount of current of the transmission coil of the wireless power transmission apparatus. However, even if the amount of current of the transmission coil is changed, the amount of power received in the wireless power reception apparatus may be maintained constant by the power converter, and the duty D of the reception power converter may be changed depending on the amount of current of the transmission coil in order to maintain the amount of received power to be constant.

Figure 8:
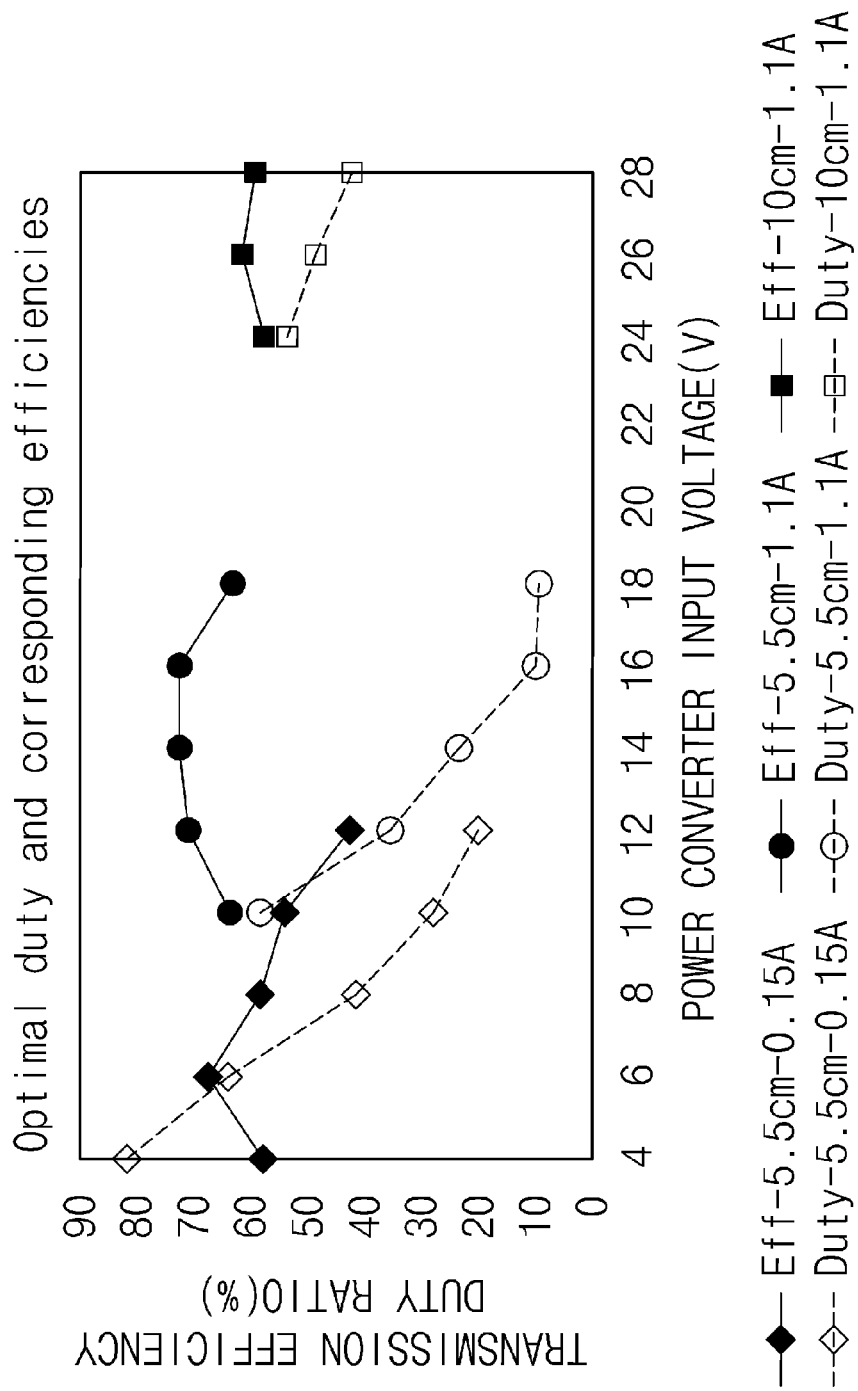
FIG. 8 is a graph illustrating a duty cycle and a power transmission efficiency of a power converter of a wireless power reception apparatus according to an embodiment of the present disclosure.

FIG. 8 is a graph illustrating a duty cycle and a power transmission efficiency of a power converter of a wireless power reception apparatus according to an embodiment of the present disclosure. That is, FIG. 8 illustrates the duty cycle and the power transmission efficiency of the power converter which are proportional to the amount of current of the transmission coil.

A technology suggested to automatically visit the optimum duty (Dopt) is as follows.

When the coupling (k) becomes smaller as the distance increases under the same load current condition, the duty D of the power converter may be automatically increased by a feedback path inside the receiver. In this case, the optimal effective load resistance (Reff, opt) is $R_{eff,opt}=R_{P2}k\sqrt{Q_{TX}Q_{RX}}$, which is decreased in proportion to k. However, since Rreflected=$k^2$wLTX (wLRX/Reff) should be kept constant, the effective load resistance (Reff) should be decreased in proportion to the square of k.

That is, when k is changed to be ⅓ times, the effective load resistance (Reff) should be decreased to be ⅑ times. That is, when the optimal effective load resistance (Reff, opt) is changed to be ⅓ times, the effective load resistance (Reff) is sharply changed to be ⅑ times. In order to solve this problem, the transmission coil current of the transmitter is increased. Then, the ratio of reducing the effective load resistance (Reff) may be adjusted to the ratio of reducing the optimal effective load resistance (Reff, opt). In such a manner, an optimum duty may be found upon the change of the coupling coefficient k.

When the load current is decreased under the same distance condition, the duty D should be increased to lower the effective load resistance (Reff). To this end, by reducing the current of the transmission coil of the transmitter, the duty D of the receiver may be increased automatically.

Figure 9:
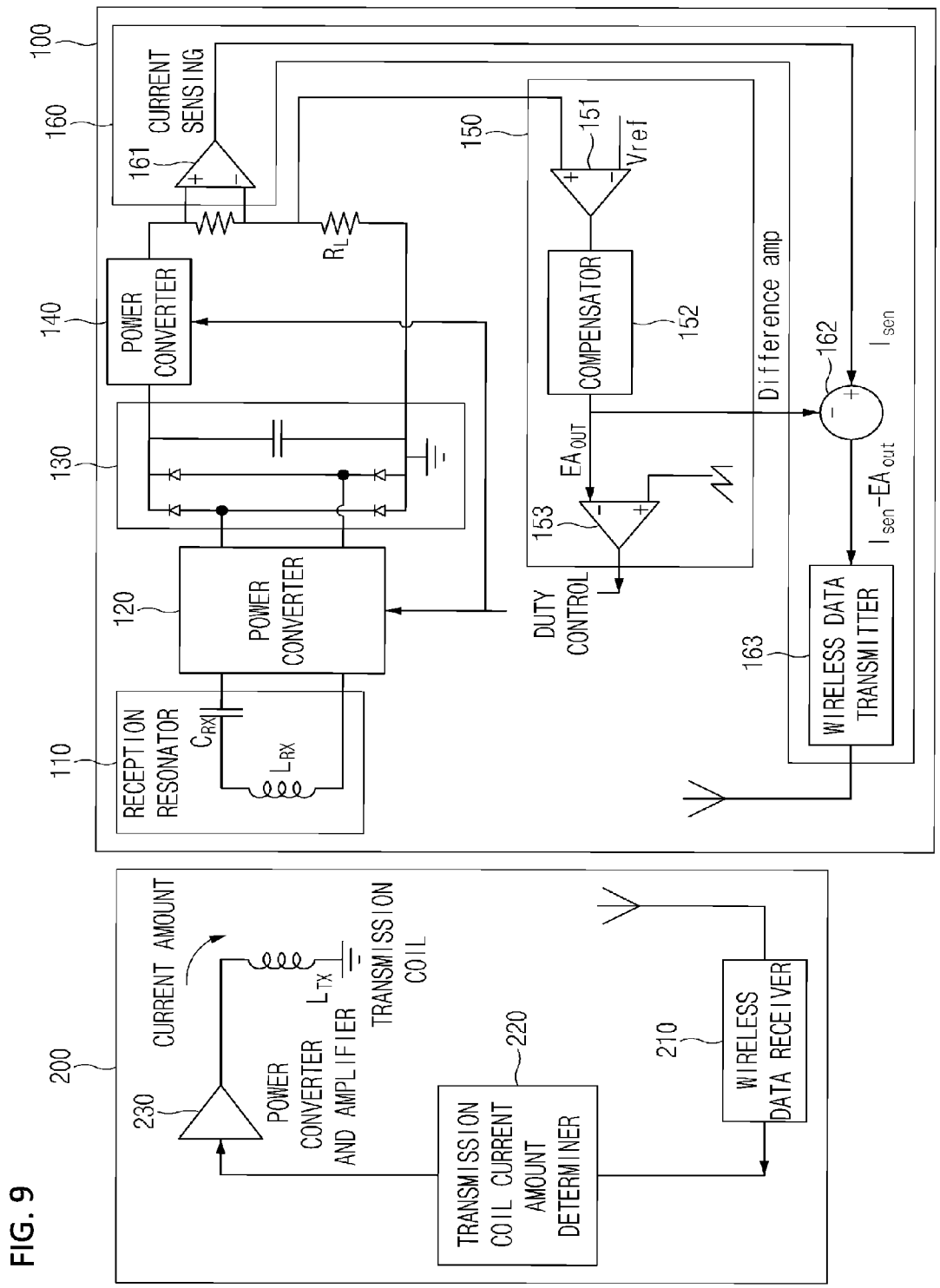
FIG. 9 is a diagram illustrating a configuration of a wireless power transmission system according to an embodiment of the present disclosure.

FIG. 9 is a diagram illustrating a configuration of a wireless power transmission system according to an embodiment of the present disclosure.

Referring to FIG. 9, the wireless power transmission system according to an embodiment of the present disclosure may include a wireless power reception apparatus 100 and a wireless power transmission apparatus 200.

The wireless power reception apparatus 100 may transmit a signal for controlling the amount of current of the transmission coil of the wireless power transmission apparatus 200 based on the distance change or the load resistance change between the wireless power transmission apparatus 200 and the wireless power reception apparatus 100 to the wireless power transmission apparatus 200. To this end, the wireless power reception apparatus 100 may include a reception resonator 110, a power converter 120, a rectifier 130, a power converter 140, a duty controller 150, a wireless data transmitter 160.

The reception resonator 110 may receive a power from the wireless power transmission apparatus 200. At this time, the reception resonator 110 may be provided with a reception coil $L_{RX}$ and a capacitor $C_{RX}$.

The power converter 120 may convert the effective load resistance according to the duty cycle output from the duty controller 150.

The rectifier 130 may rectify the current output from the power converter 120. At this time, the rectifier 130 may be provided with a plurality of diodes.

The power converter 140 may convert the effective load resistance according to the duty cycle output from the duty controller 150.

The duty controller 150 may output a signal for controlling the duty cycle of the power converter 120, 140 by using the signal output from the power converter 140 and the load resistor $R_L$. That is, the duty controller 150 may control the duty cycle of the power converter 120, 140 according to the distance change between the wireless power transmission apparatus 200 and the wireless power reception apparatus 100 or the load resistance change.

The duty controller 150 may output a control signal to increase the amount of current of the transmission coil of the wireless power transmission apparatus 200, and adjust the duty cycle so that the power converter 120, 140 may convert the effective load resistance to be decreased, when the distance between the wireless power reception apparatus 100 and the wireless power transmission apparatus 200 is increased. On the other hand, when the distance between the wireless power reception apparatus 100 and the wireless power transmission apparatus 200 is decreased, the duty controller 150 may output a control signal to decrease the amount of current of the transmission coil of the wireless power transmission apparatus 200, and adjust the duty cycle so that the power converter 120, 140 may convert the effective load resistance to be increased.

In addition, when the load resistance is increased, the duty controller 150 may output a control signal to decrease the amount of current of the transmission coil of the wireless power transmission apparatus 200, and adjust the duty cycle so that the power converter 120, 140 may convert the effective load resistance to be decreased. On the other hand, when the load resistance is decreased, the duty controller 150 may output a control signal to increase the amount of current of the transmission coil of the wireless power transmission apparatus 200, and adjust the duty cycle so that the power converter 120, 140 may convert the effective load resistance to be increased.

The duty controller 150 may determine the distance change between the wireless power reception apparatus 100 and the wireless power transmission apparatus 200 by using the duty cycle of the power converter 120, 140.

The wireless data transmitter 160 may transmit a signal that requires the control of the amount of current of the transmission coil $L_{TX}$ to the wireless power transmission apparatus 200, by using the output signal of the duty controller 150 and the output signal of the power converter 140. To this end, the wireless data transmitter 160 may be provided with a comparison amplifier 161, a comparison unit 162, and a wireless data transmitter 163.

The comparison amplifier 161 may compare the output signal of the power converter 140 with the output signal of the load resistance RL and amplify and output the signal. The comparison unit 162 may compare the output signal of the duty controller 150 with the output signal of the comparison amplifier 161.

The wireless data transmitter 163 may transmit a signal that requires the control of the amount of current of the transmission coil $L_{TX}$ to the wireless power transmission apparatus 200, by using the output signal of the comparison unit 162.

When receiving a signal for controlling the amount of current of the transmission coil from the wireless power reception apparatus 100, the wireless power transmission apparatus 200 may control the amount of current of the transmission coil according to the signal for controlling the amount of current of the transmission coil to transmit to the wireless power transmission apparatus 200. To this end, the wireless power transmission apparatus 200 may include a wireless data receiver 210, a transmission coil current amount determiner 220, a power converter 230, and a transmission coil $L_{TX}$.

The wireless data receiver 210 may receive a signal for controlling the amount of current of the transmission coil from the wireless power reception apparatus 100.

The transmission coil current amount determiner 220 may determine the amount of current of the transmission coil by using the signal for controlling the amount of current of the transmission coil received from the wireless power reception apparatus 100.

The power converter 230 may output a power according to the determined amount of current of the transmission coil.

Figure 17:
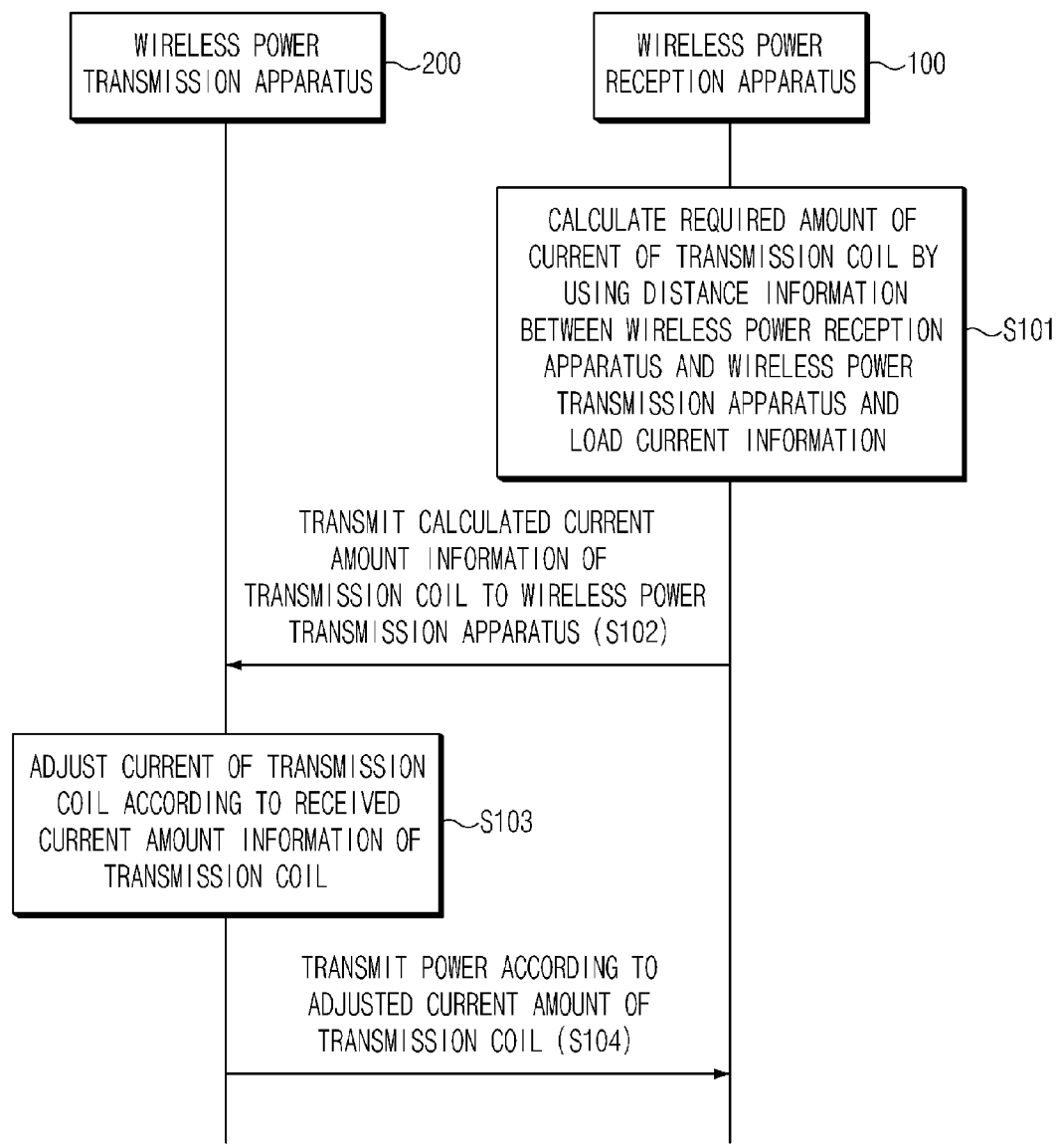
FIG. 17 is a flowchart illustrating a wireless power transmission method according to an embodiment of the present disclosure.

Hereinafter, an operation of the wireless power transmission system of FIG. 9 is described in detail with reference to FIG. 17.

First, the wireless power reception apparatus 100 may calculate a required amount of current of the transmission coil by using the distance information between the wireless power reception apparatus 100 and the wireless power transmission apparatus 200 and the load current information (S101) and transmit the signal for controlling the amount of current of the transmission coil to the wireless power transmission apparatus 200 (S102). In this case, the required amount of current of the transmission coil may be calculated so that the power converter of the wireless power reception apparatus 100 may be able to change an actual load resistance to an optimum effective load resistance.

Therefore, the wireless power transmission apparatus 200 may adjust the current of the transmission coil according to the received signal for controlling the amount of current of the transmission coil (S103), and transmit a power according to the adjusted amount of current of the transmission coil (S104). Accordingly, even if the distance between the wireless power reception apparatus 100 and the wireless power transmission apparatus 200 and the load current of the wireless power reception apparatus 100 are changed, the effective load resistance converted by the power converter of the wireless power reception apparatus 100 may be maintained close to the optimum effective load resistance which enables to achieve a maximum power transmission efficiency.

Figure 10:
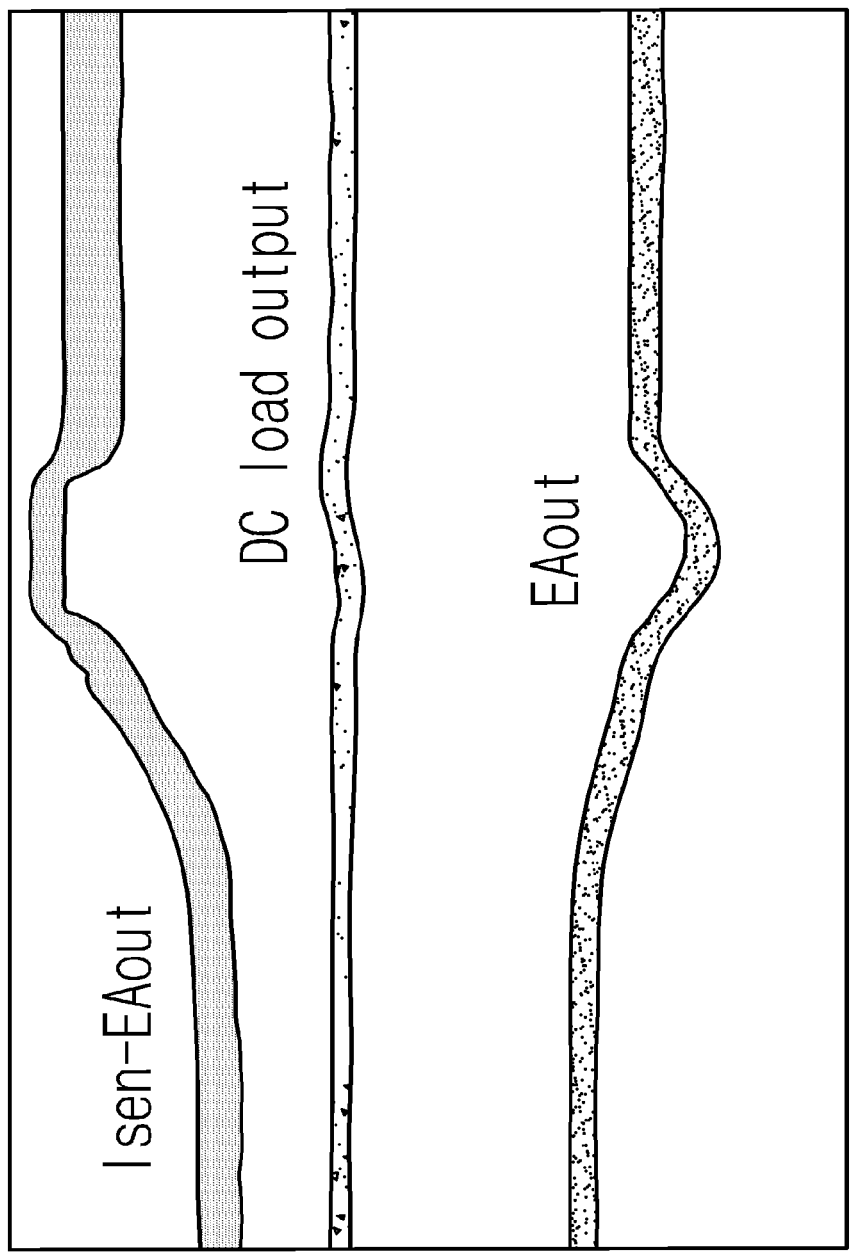
FIG. 10 is a diagram illustrating a waveform when the distance between a wireless power transmission apparatus and a wireless power reception apparatus increases according to an embodiment of the present disclosure.
Figure 11:
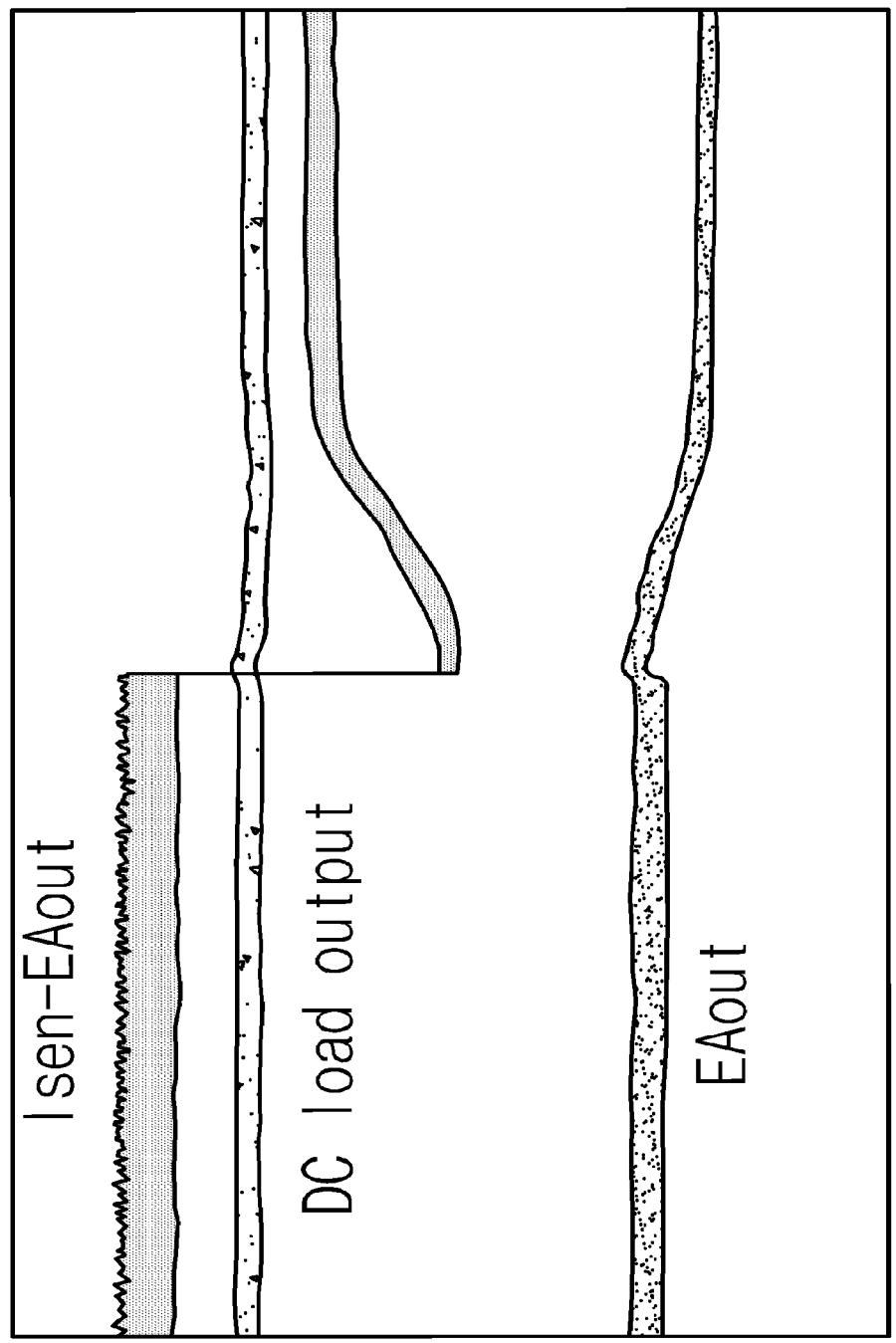
FIG. 11 is a diagram illustrating a waveform when a load current is reduced according to an embodiment of the present disclosure.

FIG. 10 is a diagram illustrating a waveform when the distance between a wireless power transmission apparatus and a wireless power reception apparatus increases according to an embodiment of the present disclosure, and FIG. 11 is a diagram illustrating a waveform when a load current is reduced according to an embodiment of the present disclosure.

Referring to FIG. 9 and FIG. 10, the duty cycle for the electric power converter 120, 140 may be determined in such a manner that the DC output voltage of the load resistor RL may be identical with the reference voltage (Vref). This is a quick feedback which enables to regulate the DC output voltage.

At this time, when the coupling (k) is decreased as the distance between the wireless power transmission apparatus 200 and the wireless power reception apparatus 100 is increased, the output voltage (EAout) of a compensator 152 may be decreased and the output voltage (Isen-EAout) of the comparison unit 162 may be increased in order to increase the duty cycle.

When a signal for determining the amount of current of the transmission coil is transmitted to the wireless power transmission apparatus 200, the wireless power transmission apparatus 200 may increase the amount of current of the transmission coil. In response to this, the duty controller 150 may maintain a negative feedback state which slightly lowers the degree of the duty cycle of the power converter 120, 140 and slightly increases the output voltage (EAout). Therefore, the rapid change of the effective load resistance (Reff) may be prevented and it is also prevented that the effective load resistance (Reff) deviates significantly from the optimum effective load resistance (Reff, opt).

Referring to FIG. 11, when the load current is decreased (i.e., when the actual load resistance is increased), the output voltage (Isen) of the comparison amplifier 161 may be decreased and the output voltage (Isen-EAout) of the comparison unit 162 may also be decreased. This data may be transmitted to the wireless power transmission apparatus 200, and the wireless power transmission apparatus 200 may lower the amount of current of the transmission coil. In response this, the power converter 120, 140 of the wireless power reception apparatus 100 may increase the duty cycle. Therefore, it is possible to maintain the effective load resistance to be small.

Thus, the duty control method in the present disclosure does not use the method of checking individually a point representing the optimum efficiency through an operation point sweeping like a related art, but uses an analog feedback to achieve a rapid response speed. Hence, in the present disclosure, it is possible to implement a small and low-cost system by only an analog sensing and feedback without separate FPGA and microcontroller.

Figure 12:
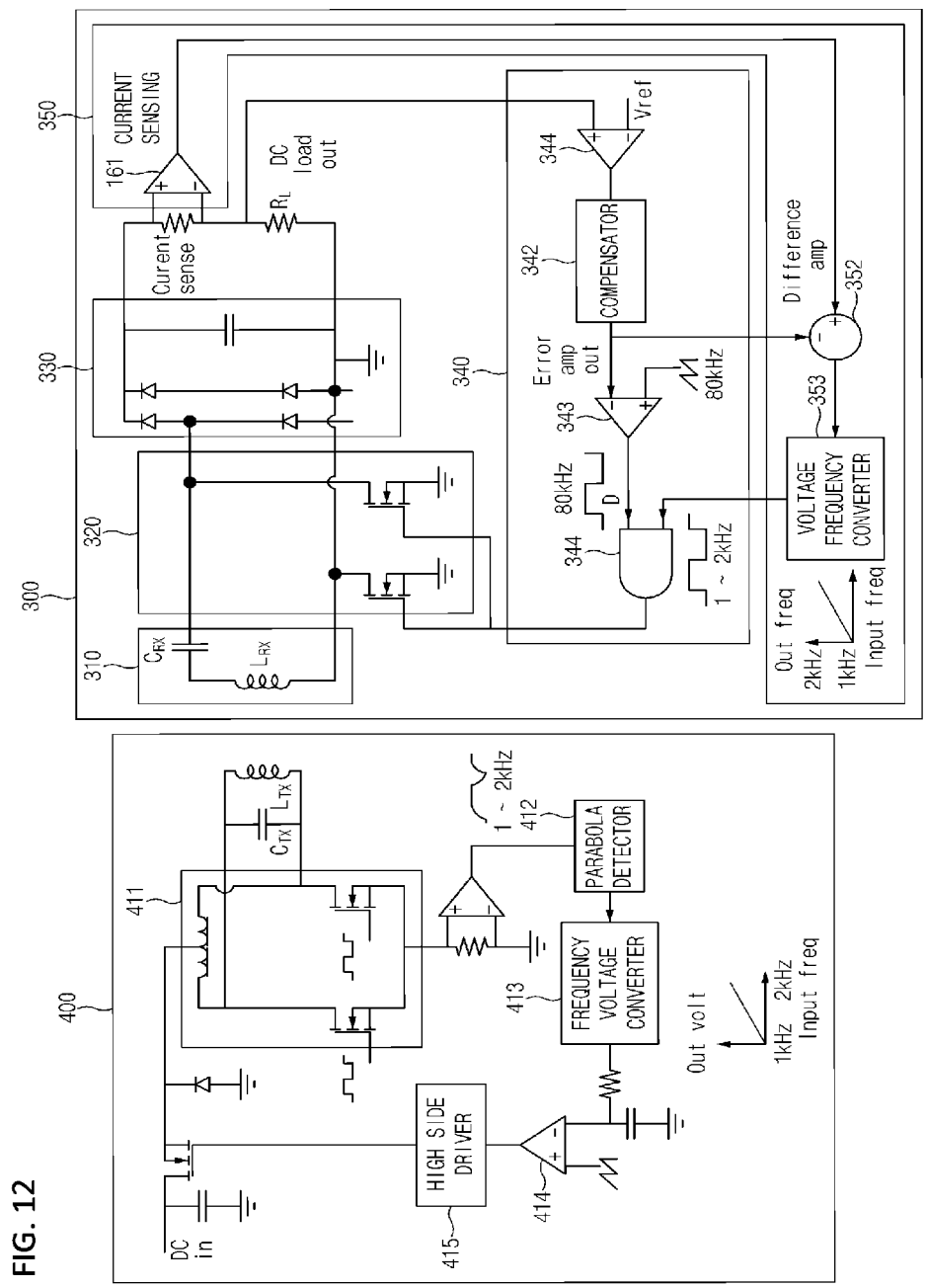
FIG. 12 is a diagram illustrating a configuration of a wireless power transmission system according to another embodiment of the present disclosure.

FIG. 12 is a diagram illustrating a configuration of a wireless power transmission system according to another embodiment of the present disclosure. That is, FIG. 12 is an example of a back telemetry communication method that modulates the duty cycle of the power converter at a very low frequency (1-2 kHz) without using a separate RF wireless data communication module and transmits a data pulse of same 1-2 kHz to the wireless power transmission apparatus 200.

At this time, the duty cycle may be forced to achieve every 1-2 kHz. Therefore, the supply current of the transmitter may be decreased every 1-2 kHz, which may be detected to read the data of the wireless power reception apparatus 300 from the wireless power transmission apparatus 400. This is a kind of load-shift keying (LSK) method, but has an advantage in comparison with a conventional LSK method. In a conventional LSK circuit, a resistor and a switch may be additionally provided between the DC output voltage and a ground and, when the switch is turned on to send data, the DC output power is consumed through the resistance. Accordingly, there is a problem of low power transmission efficiency. However, the communication method suggested in FIG. 12 has an advantage in that there is no additional power loss through the resistance and separate antenna and communication module for wireless communication are not required.

Figure 13:
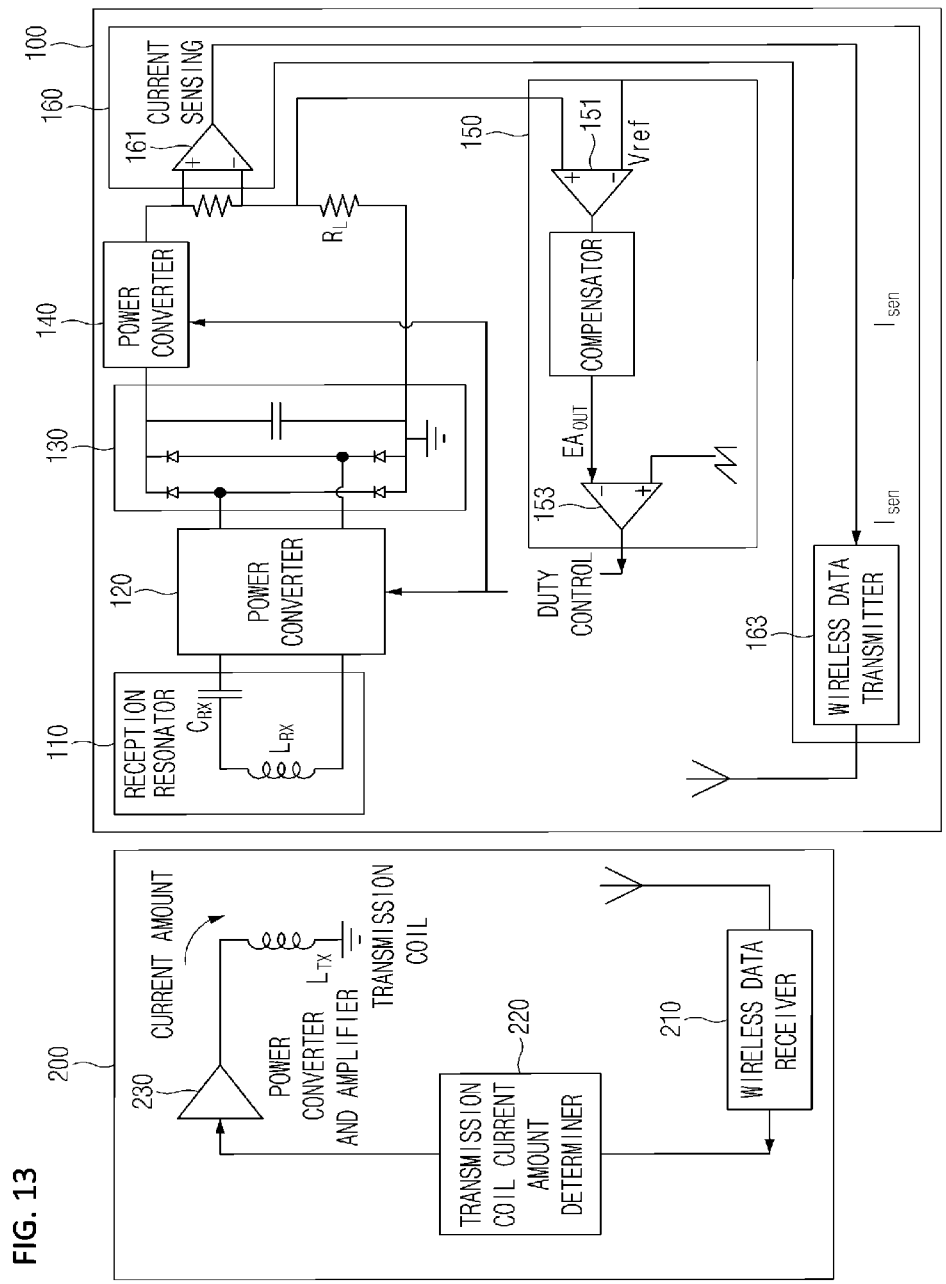
FIG. 13 is a diagram illustrating a configuration of a wireless power transmission system for explaining a method of controlling an effective load resistance conversion ratio of a power converter when a load current is changed according to an embodiment of the present disclosure.

FIG. 13 is a diagram illustrating a configuration of a wireless power transmission system for explaining a method of controlling an effective load resistance conversion ratio of a power converter when a load current is changed according to an embodiment of the present disclosure. That is, FIG. 13 is a simple example of adjusting the duty cycle only for the load current change not adjusting the duty cycle for the distance change. This adjusts the conversion ratio only for the load current change in an application in which the distance change is not severe.

Figure 14:
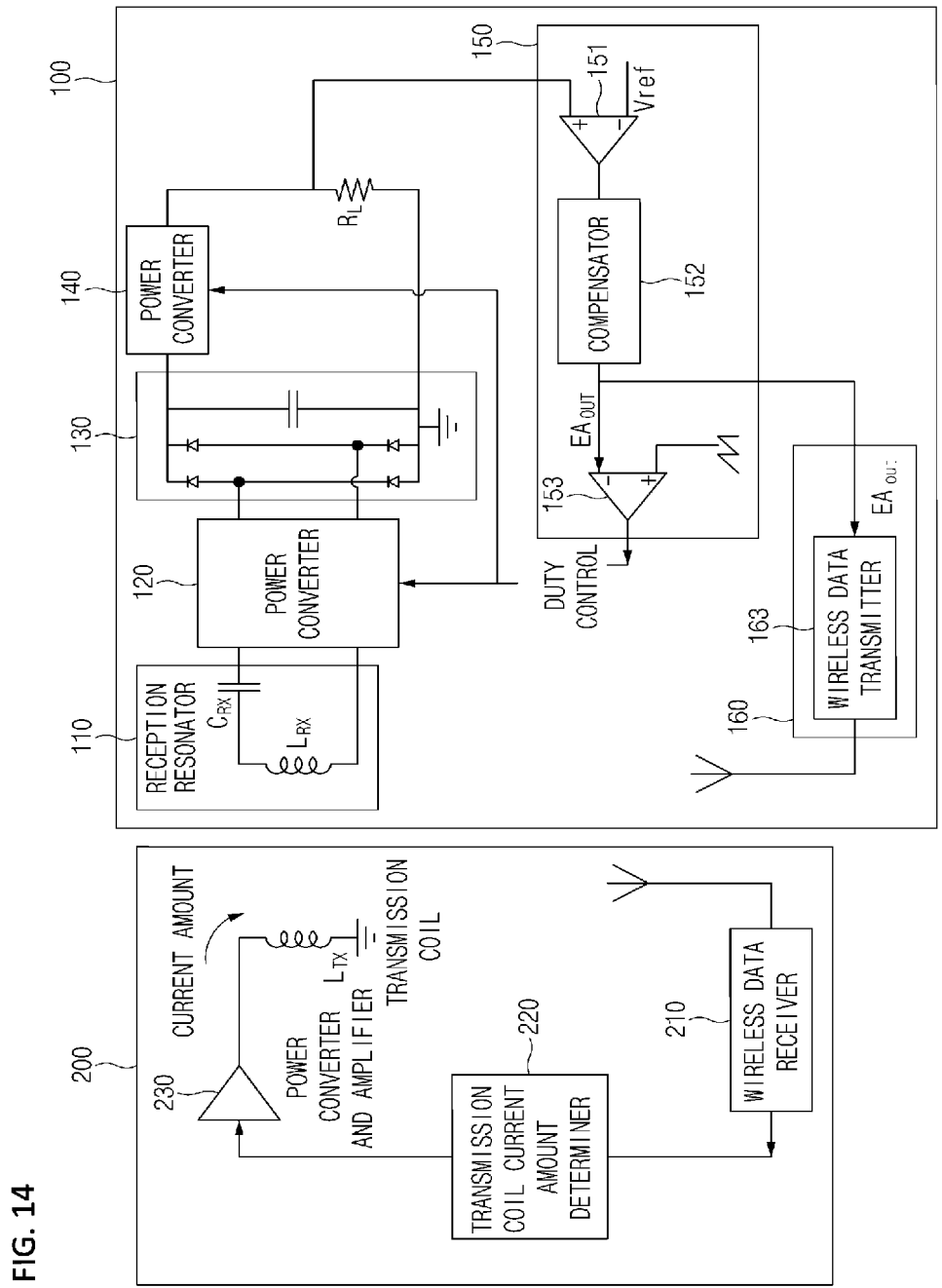
FIG. 14 is a diagram illustrating a configuration of a wireless power transmission system for explaining a method of controlling an effective load resistance conversion ratio of a power converter when a distance is changed according to an embodiment of the present disclosure.

FIG. 14 is a diagram illustrating a configuration of a wireless power transmission system for explaining a method of controlling an effective load resistance conversion ratio of a power converter when a distance is changed according to an embodiment of the present disclosure. That is, FIG. 14 is a simple example of adjusting the duty cycle only for the distance change not adjusting the duty cycle for the load current.

Figure 15:
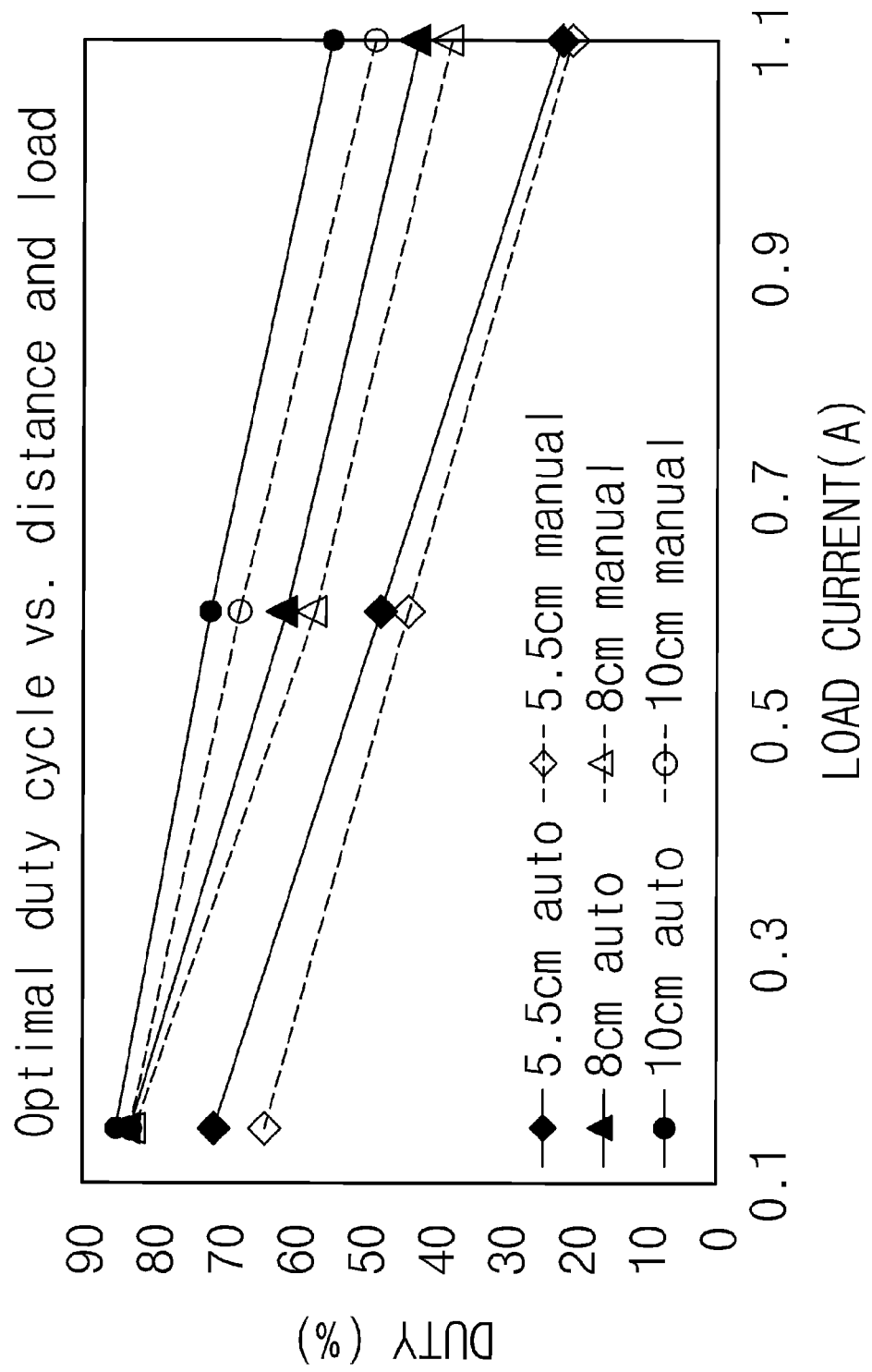
FIG. 15 is a graph comparing a duty cycle obtained by an automatic control with a duty cycle obtained by a manual control in a wireless power transmission system according to an embodiment of the present disclosure.

FIG. 15 is a graph comparing a duty cycle obtained by an automatic control with a duty cycle obtained by a manual control in a wireless power transmission system according to an embodiment of the present disclosure. Referring to FIG. 15, it can be seen that the duty cycle obtained by the present invention, the duty cycle obtained by an automatic control is substantially similar to the duty cycle obtained by a manual control in the wireless power transmission system according to an embodiment of the present disclosure.

Figure 16:
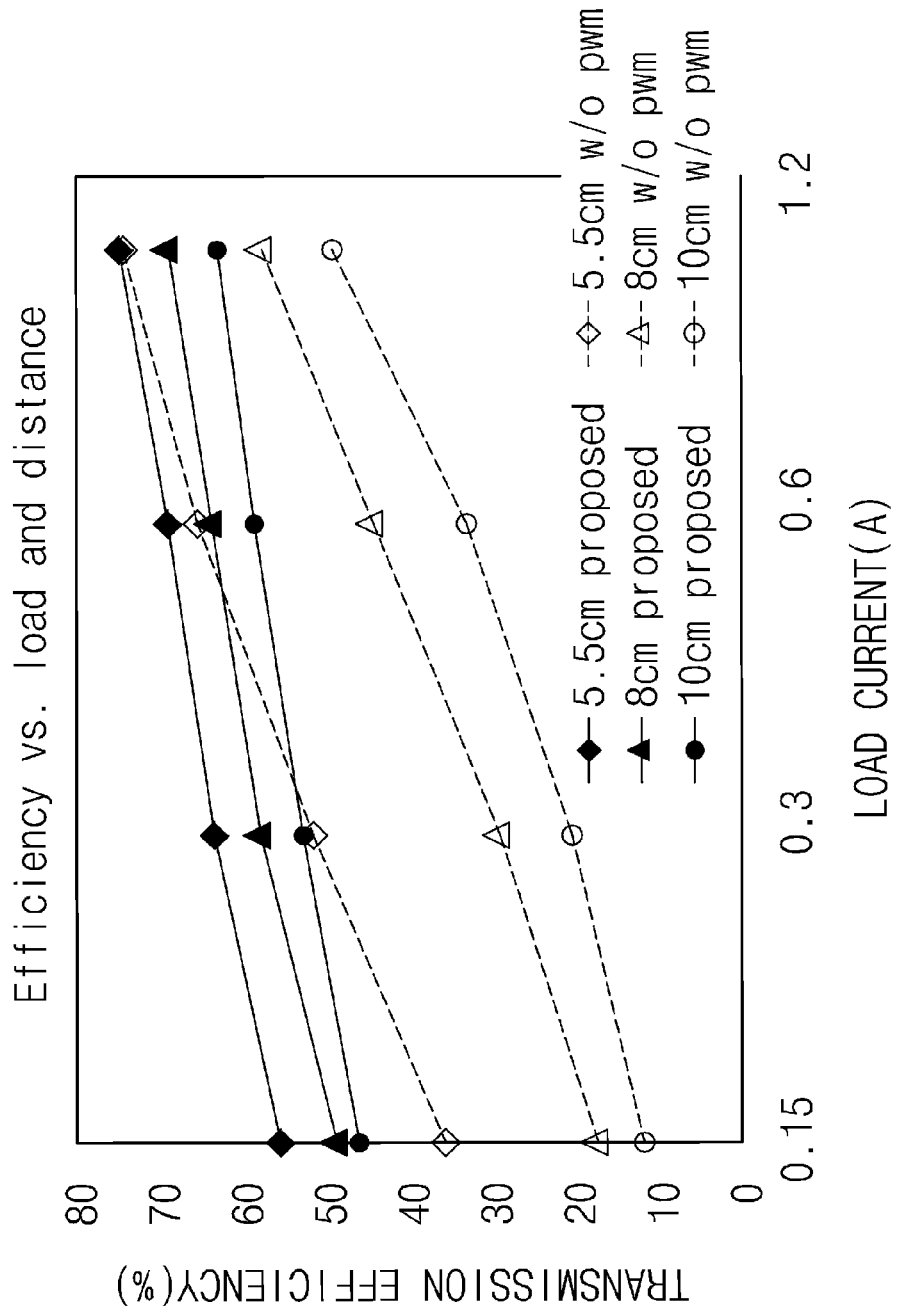
FIG. 16 is a graph comparing a transmission efficiency in the case of using and not using an effective load resistance modulation in a wireless power transmission system according to an embodiment of the present disclosure.

FIG. 16 is a graph comparing a transmission efficiency in the case of using and not using an effective load resistance modulation in a wireless power transmission system according to an embodiment of the present disclosure. Referring to FIG. 16, it can be seen that the transmission efficiency in the case of using the effective load resistance conversion control method is higher than of the transmission efficiency in the case of not using the effective load resistance conversion control method.

As described above, the present disclosure may provide an optimum load resistance condition by adjusting the effective load resistance conversion ratio of the receiver automatically according to the distance change between the wireless power transmission apparatus and the wireless power reception apparatus and/or the load resistance change of the wireless power reception apparatus, so that it is possible to maximize the wireless transmission efficiency.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A wireless power reception apparatus which receives a power from a wireless power transmission apparatus, the wireless power reception apparatus comprising:
    a duty controller configured to calculate an amount of current of a transmission coil required for the wireless power transmission apparatus and control a duty cycle by using at least one of distance information between the wireless power transmission apparatus and the wireless power reception apparatus or load current information for an actual load resistance;
    a power converter configured to convert the actual load resistance into an effective load resistance according to the duty cycle;
    a wireless data transmitter configured to transmit a signal that requires a control of the calculated amount of current of the transmission coil to the wireless power transmission apparatus; and
    a reception resonator configured to receive a power according to the amount of current of the transmission coil controlled by the signal that requires a control of the amount of current of the transmission coil from the wireless power transmission apparatus,
    wherein the duty controller controls the duty cycle of the power converter in response to the power received according to the amount of current of the transmission coil controlled by the signal that requires a control of the amount of current of the transmission coil,
    wherein the wireless data transmitter transmits a signal requesting to increase the amount of current of the transmission coil to the wireless power transmission apparatus, and the duty controller controls the power converter to decrease the effective load resistance when a distance between the wireless power transmission apparatus and the wireless power reception apparatus increases,
    wherein the wireless data transmitter transmits a signal requesting to decrease the amount of current of the transmission coil to the wireless power transmission apparatus and the duty controller controls the power converter to decrease the effective load resistance, when a load resistance of the wireless power reception apparatus increases.

2. The wireless power reception apparatus of claim 1, further comprising a rectifier configured to rectify and output the current outputted from the reception resonator.

3. The wireless power reception apparatus of claim 2, wherein the power converter is located between the reception resonator and the rectifier.

4. The wireless power reception apparatus of claim 2, wherein the power converter is located in an output terminal of the rectifier.

5. The wireless power reception apparatus of claim 1, wherein the duty controller determines a distance change between the wireless power transmission apparatus and the wireless power reception apparatus increases by using a PWM duty cycle of the power converter.

6. The wireless power reception apparatus of claim 1, wherein the wireless data transmitter periodically modulates and transmits the duty cycle of the power converter at a frequency band lower than a preset reference, when transmitting the signal for a control of the amount of current of the transmission coil to the wireless power transmission apparatus.

7. A wireless power transmission system comprising:
    a wireless power transmission apparatus configured to transmit a power according to an amount of current of a transmission coil; and
    a wireless power reception apparatus configured to receive the power transmitted from the wireless power transmission apparatus,
    wherein, when the wireless power reception apparatus transmits a signal for controlling the amount of current of a transmission coil of the wireless power transmission apparatus to the wireless power transmission apparatus according to a distance change between the wireless power transmission apparatus and the wireless power reception apparatus or a load resistance change, the wireless power transmission apparatus adjusts the amount of current of a transmission coil according to the signal for controlling the amount of current of a transmission coil and transmits a power, and the wireless power reception apparatus adjusts a duty cycle of a power converter in response to the adjusted amount of current of a transmission coil,
    wherein the wireless power transmission apparatus controls to increase the amount of current of the transmission coil and to decrease the effective load resistance when a distance between the wireless power transmission apparatus and the wireless power reception apparatus increases,
    wherein the wireless power transmission apparatus controls to decrease the amount of current of the transmission coil and to decrease the effective load resistance, when a load resistance of the wireless power reception apparatus increases.

8. A method of receiving a power by a wireless power reception apparatus comprising a reception resonator and a power converter from a wireless power transmission apparatus, the method comprising:

transmitting a signal for controlling an amount of current of a transmission coil of the wireless power transmission apparatus to the wireless power transmission apparatus according to a distance change between the wireless power transmission apparatus and the wireless power reception apparatus or a load resistance change;

receiving a power which is outputted after the amount of current of a transmission coil is adjusted from the wireless power transmission apparatus;

adjusting an effective load resistance conversion ratio of the power converter in response to the received power; and converting an actual load resistance into an effective load resistance according to the effective load resistance conversion ratio, wherein transmitting a signal for controlling an amount of current of a transmission coil of the wireless power transmission apparatus to the wireless power transmission apparatus comprises transmitting a signal requesting to increase the amount of current of the transmission coil to the wireless power transmission apparatus when a distance between the wireless power transmission apparatus and the wireless power reception apparatus increases, wherein transmitting a signal for controlling an amount of current of a transmission coil of the wireless power transmission apparatus to the wireless power transmission apparatus comprises transmitting a signal requesting to decrease the amount of current of the transmission coil to the wireless power transmission apparatus, when a load resistance of the wireless power reception apparatus increases.

9. The method of claim 8, wherein adjusting an effective load resistance conversion ratio of the power converter in response to the received power comprises increasing the effective load resistance conversion ratio, when the amount of current of the transmission coil is decreased.

10. The method of claim 9, wherein adjusting an effective load resistance conversion ratio of the power converter in response to the received power comprises decreasing the effective load resistance conversion ratio, when the amount of current of the transmission coil is increased.

* * * * *